(12) United States Patent
Okuoka

(10) Patent No.: US 12,174,454 B2
(45) Date of Patent: Dec. 24, 2024

(54) OPTICAL SYSTEM AND IMAGE CAPTURING APPARATUS INCLUDING THE SAME

(71) Applicant: CANON KABUSHIKI KAISHA, Tokyo (JP)

(72) Inventor: Shinya Okuoka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 18/045,747

(22) Filed: Oct. 11, 2022

(65) Prior Publication Data

US 2023/0061917 A1    Mar. 2, 2023

Related U.S. Application Data

(63) Continuation of application No. 16/838,932, filed on Apr. 2, 2020, now Pat. No. 11,500,175.

(30) Foreign Application Priority Data

Apr. 12, 2019 (JP) .................... 2019-076160

(51) Int. Cl.
*G02B 9/34* (2006.01)

(52) U.S. Cl.
CPC ................... *G02B 9/34* (2013.01)

(58) Field of Classification Search
CPC .......... G02B 9/00; G02B 9/34; G02B 15/144; G02B 15/1441; G02B 13/001; G02B 13/0045; G02B 13/02
USPC ....... 359/772, 773, 771, 763, 764, 756, 757, 359/755, 682, 686, 749–753
See application file for complete search history.

(56) References Cited

U.S. PATENT DOCUMENTS

| | | | |
|---|---|---|---|
| 2006/0066951 A1* | 3/2006 | Sensui | G02B 27/646 359/672 |
| 2010/0157445 A1* | 6/2010 | Taki | G02B 13/24 359/764 |
| 2011/0286116 A1* | 11/2011 | Shimizu | G02B 15/144105 359/772 |
| 2018/0246292 A1* | 8/2018 | Tomioka | G02B 15/173 |

FOREIGN PATENT DOCUMENTS

JP    2018205435 A    12/2018

OTHER PUBLICATIONS

Herbert Gross, "Handbook of Optical Systems", Wiley, vol. 3, pp. 377-378, 2007 (Year: 2007).*

* cited by examiner

*Primary Examiner* — Marin Pichler
(74) *Attorney, Agent, or Firm* — Canon U.S.A., Inc. IP Division

(57) ABSTRACT

An optical system includes, in order from an object side to an image side, a first lens unit having a positive refractive power, a second lens unit having a negative refractive power, an intermediate unit including one or more lens units, and a final lens unit having a negative refractive power. The second lens unit is moved toward an image plane, and a lens unit closest to the image plane in the one or more lens units included in the intermediate unit is moved toward the object in focusing from infinity to a short distance. The second lens unit satisfies a predetermined inequality.

16 Claims, 7 Drawing Sheets

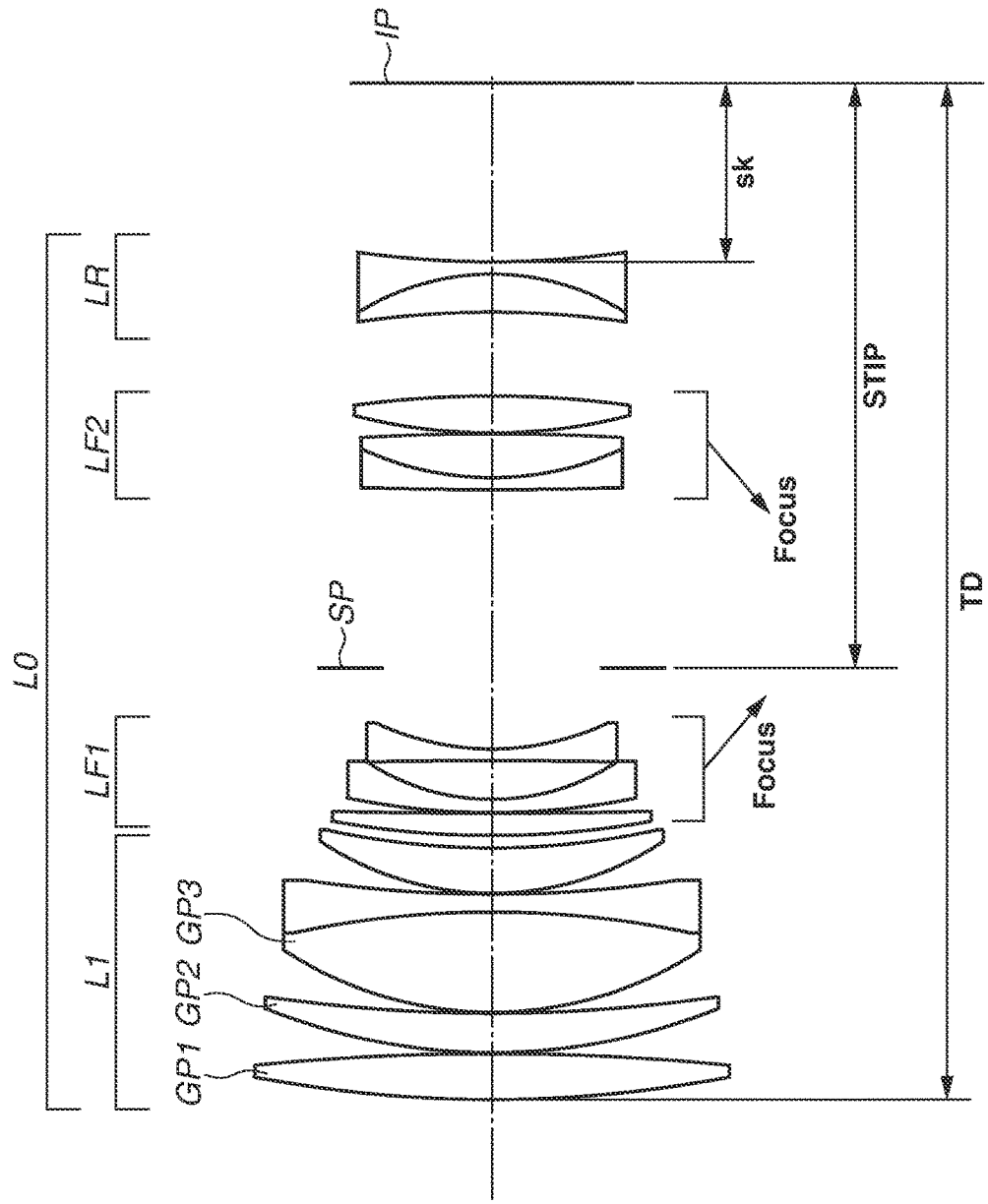

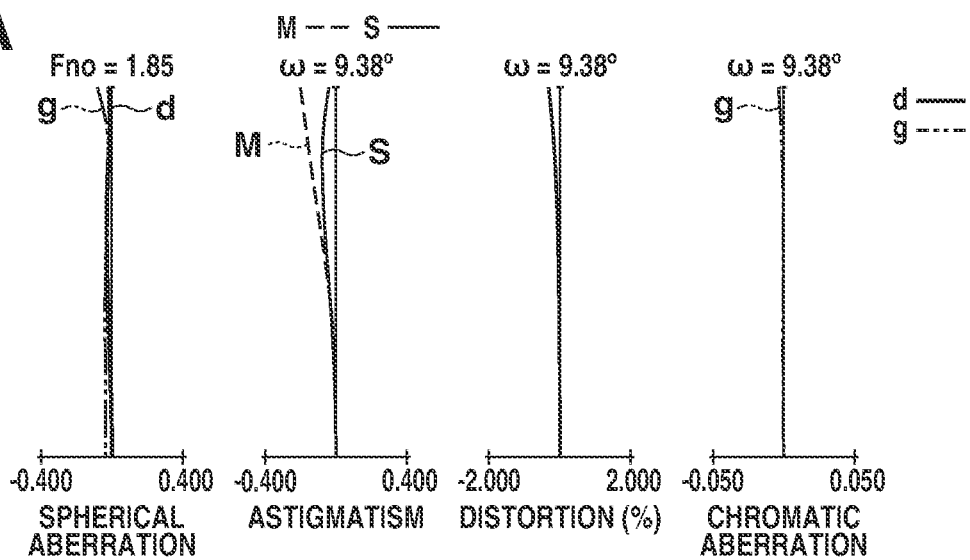
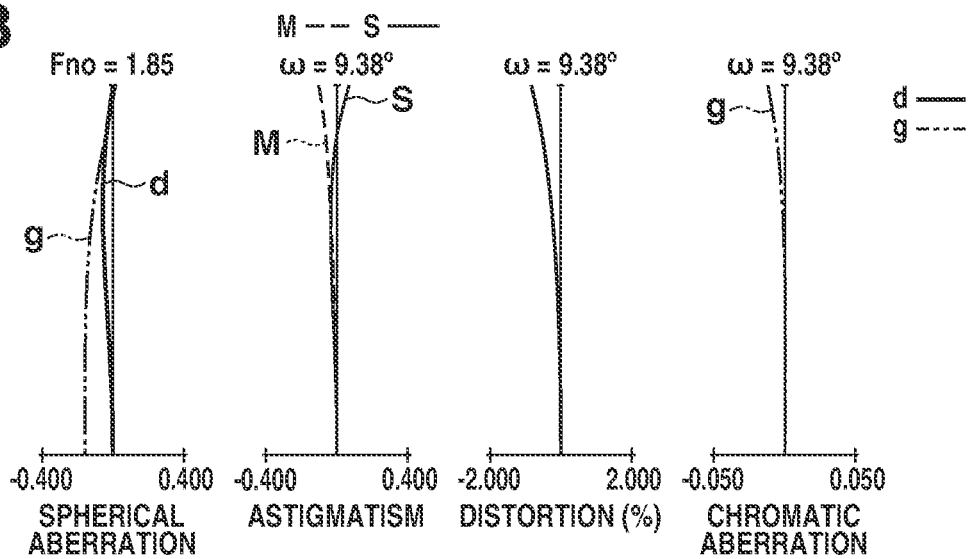
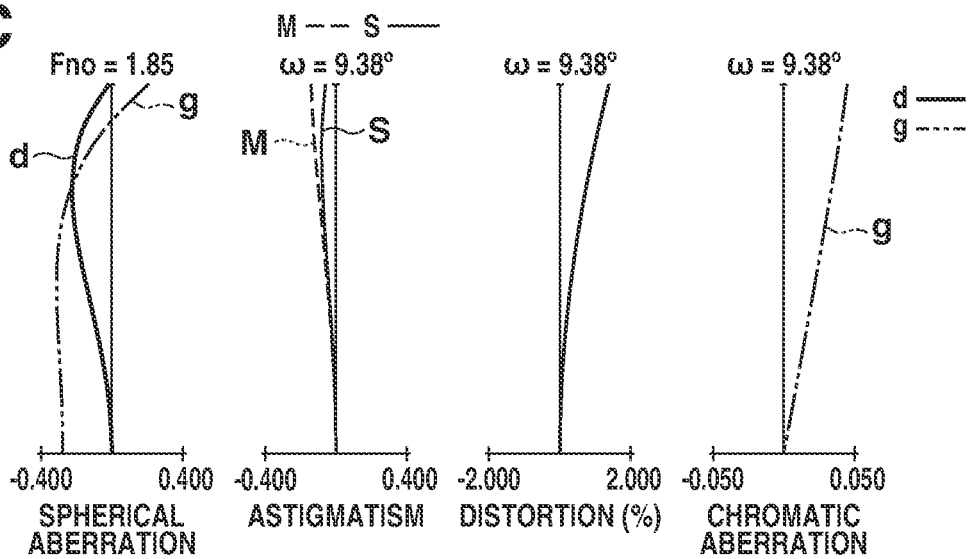

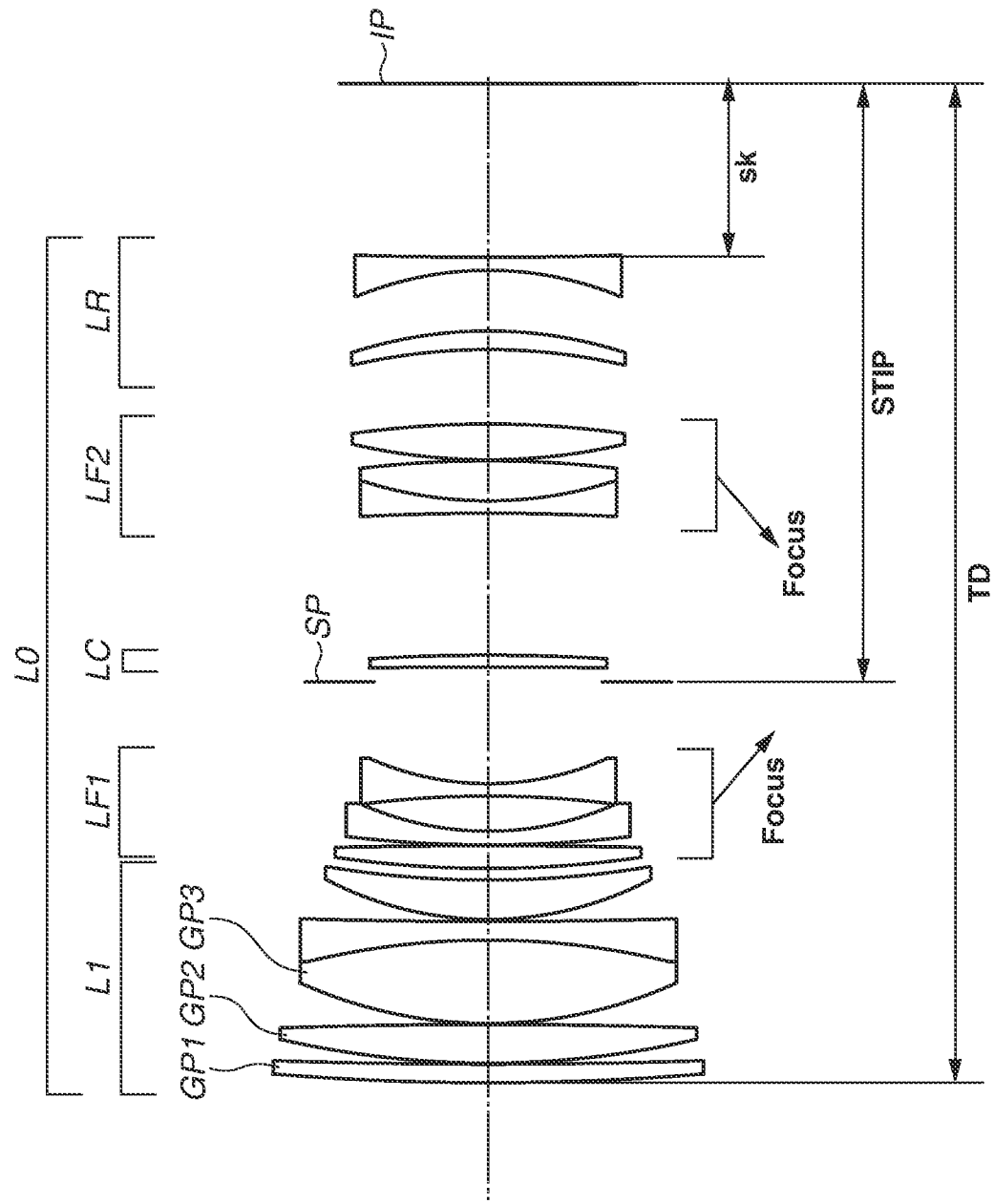

OPTICAL SYSTEM AND IMAGE CAPTURING APPARATUS INCLUDING THE SAME

CROSS-REFERENCE TO RELATED APPLICATION

This application is a Continuation of U.S. application Ser. No. 16/838,932, filed Apr. 2, 2020, which claims priority from Japanese Patent Application No. 2019-076160, filed Apr. 12, 2019, which is hereby incorporated by reference herein in its entirety.

BACKGROUND OF THE INVENTION

Field of the Invention

The present invention relates to an optical system which is suitable for an image capturing apparatus, such as a digital video camera, a digital still camera, a broadcasting camera, a silver-halide film camera, and a monitoring camera.

Description of the Related Art

It is generally known that an aberration fluctuation in focusing becomes larger as an imaging magnification becomes higher.

According to United States Patent Application Publication No. 20110286116, an optical system is discussed which includes a first lens group of a positive refractive power, a second lens group of a negative refractive power, a third lens group of a positive refractive power, and a trailing lens set succeeding to the third lens group. In the optical system discussed in United States Patent Application Publication No. 2011/0286116, the second lens group is moved toward an imaging plane, and the third lens group is moved toward an object in focusing from infinity to proximity, so that a variation in aberrations is reduced during focusing from infinity to proximity.

SUMMARY OF THE INVENTION

According to an aspect of the embodiments, an optical system includes, in order from an object side to an image side, a first lens unit having a positive refractive power, a second lens unit having a negative refractive power, an intermediate unit including one or more lens units, and a final lens unit having a negative refractive power. A distance between adjacent lens units changes in focusing. The first lens unit includes a positive lens GP1 closest to an object and a positive lens GP2 adjacent to the image side of the positive lens GP1. In focusing from infinity to a short distance, the second lens unit is moved toward an image plane, and a lens unit closest to the image plane in the one or more lens units included in the intermediate unit is moved toward the object. The following inequality is satisfied:

$-0.4 < MF1/MF2 < 0$, where MF1 is an amount of movement of the second lens unit, and MF2 is an amount of movement of the lens unit closest to the image plane in the one or more lens units included in the intermediate unit, the movement of the second lens unit and the movement of the lens unit being accompanied by focusing from a state in which an object is in focus at infinity to a state in which the object is in focus with an imaging magnification of −0.2.

According to another aspect of the embodiments, an optical system includes, in order from an object side to an image side, a first lens unit having a positive refractive power, a second lens unit having a negative refractive power, an intermediate unit including one or more lens units, and a final lens unit having a negative refractive power. A distance between adjacent lens units changes in focusing. The first lens unit includes a positive lens GP1 closest to an object and a positive lens GP2 adjacent to the image side of the positive lens GP1. In focusing from infinity to a short distance, the second lens unit is moved toward an image plane, and a lens unit closest to the image plane in the one or more lens units included in the intermediate unit is moved toward the object. The following inequality is satisfied:

$-0.37 < fF1/f < 0$, where fF1 is a focal length of the second lens unit, and f is a focal length of the optical system when an object is in focus at infinity.

According to yet another aspect of the embodiments, an optical system includes, in order from an object side to an image side, a first lens unit having a positive refractive power, a second lens unit having a negative refractive power, an intermediate unit including one or more lens units, and a final lens unit having a negative refractive power. A distance between adjacent lens units changes in focusing. In focusing from infinity to a short distance, the second lens unit is moved toward the image plane, and a lens unit closest to an image plane in the one or more lens units included in the intermediate unit is moved toward an object. The following inequalities are satisfied:

$-0.4 < MF1/MF2 < 0$; and $-0.37 < fF1/f < 0$, where MF1 is an amount of movement of the second lens unit, and MF2 is an amount of movement of the lens unit closest to the image plane in the one or more lens units included in the intermediate unit, the movement of the second lens unit and the movement of the lens unit being accompanied by focusing from a state in which an object is in focus at infinity to a state in which the object is in focus with an imaging magnification of −0.2, fF1 is a focal length of the second lens unit, and f is a focal length of the optical system when an object is in focus at infinity.

According to further yet another aspect of the embodiments, an image capturing apparatus includes the optical system described above and an image pickup element which receives an optical image formed by the optical system.

Further features of the present invention will become apparent from the following description of exemplary embodiments with reference to the attached drawings.

BRIEF DESCRIPTION OF THE DRAWINGS

FIG. 1 is a sectional view of an optical system according to a first exemplary embodiment.

FIGS. 2A, 2B, and 2C are aberration diagrams of the optical system according to the first exemplary embodiment.

FIG. 5 is a sectional view of an optical system according to a third exemplary embodiment.

DESCRIPTION OF THE EMBODIMENTS

Exemplary embodiments of an optical system according to the present invention and an image capturing apparatus including the optical system will be described below with reference to the accompanying drawings.

Figure 3:
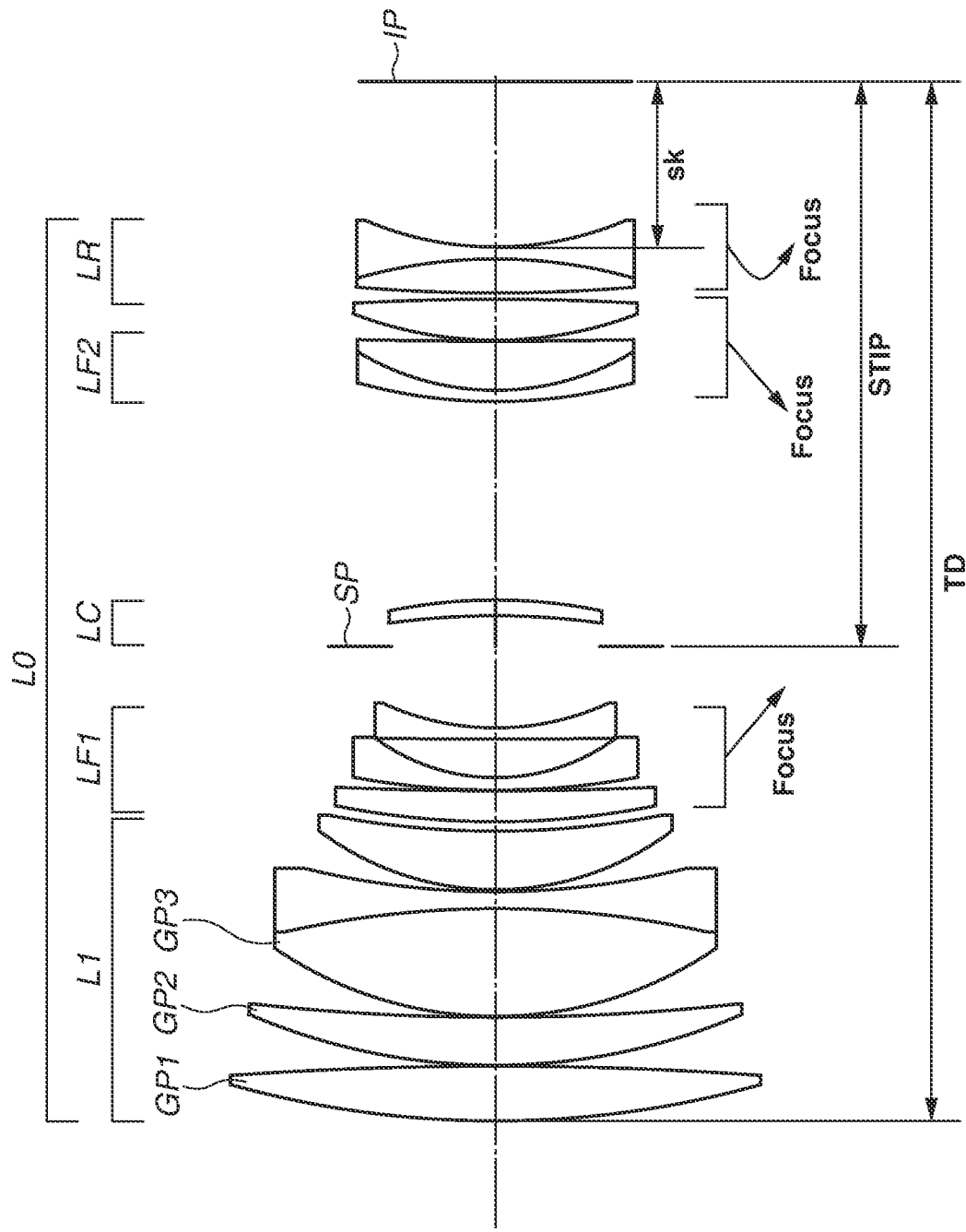
FIG. 3 is a sectional view of an optical system according to a second exemplary embodiment.

FIGS. 1, 3, and 5 are cross-sectional views of lenses in optical systems according to first to third exemplary embodiments, respectively. The optical system according to the first exemplary embodiment has an F-number of 1.85 and an imaging angle of view of 18.76 degrees. The optical system according to the second exemplary embodiment has an F-number of 1.85 and an imaging angle of view of 16.41 degrees. The optical system according to the third exemplary embodiment has an F-number of 1.85 and an imaging angle of view of 23.29 degrees.

An optical system L0 according to each of the exemplary embodiments is used in an image capturing apparatus, such as a digital still camera, a video camera, a silver-halide film camera, and a broadcasting camera, and a projection apparatus, such as a projector. In the sectional views of lenses, a left side is an object side (an enlargement side), and a right side is an image side (a reduction side).

In each of the cross-sectional views of lenses, an aperture stop SP determines (limits) a light flux of a full aperture F-number (Fno). In a case where the optical system is used as an imaging optical system in a video camera or a digital still camera, an image plane IP corresponds to an image capturing surface of an image pickup element (a photoelectric conversion element), such as a charge coupled device (CCD) sensor and a complementary metal oxide semiconductor (CMOS) sensor. Arrows regarding Focus indicate movement directions of lens units in focusing from infinity to a short distance.

The optical system L0 according to each of the exemplary embodiments includes, in order from the object side to the image side, a first lens unit L1 having a positive refractive power, a second lens unit LF1 having a negative refractive power, an intermediate unit including one or more lens units, and a final lens unit LR having the negative refractive power. In the optical system L0 according to each of the exemplary embodiments, at least two lens units are moved in focusing, and a distance between adjacent lens units is changed. Furthermore, in focusing from infinity to a short distance, the second lens unit LF1 is moved toward the image plane, and a lens unit LF2, which is arranged closest to the image plane in the lens units included in the intermediate unit, is moved toward the object. A lens unit according to the present specification is a component of the optical system L0 including one or a plurality of lenses.

The optical system L0 according to the first exemplary embodiment includes the first lens unit L1 having the positive refractive power, the second lens unit LF1 having the negative refractive power, a third lens unit LF2 having the positive refractive power, and a fourth lens unit LR having the negative refractive power. The third lens unit LF2 corresponds to the intermediate unit, and the fourth lens unit LR corresponds to the final lens unit. In focusing from infinity to a short distance, the second lens unit LF1 is moved toward the image plane, the third lens unit LF2 is moved toward the object, and the first lens unit L1 and the fourth lens unit LR are immobilized.

The optical system L0 according to the second exemplary embodiment includes the first lens unit L1 having the positive refractive power, the second lens unit LF1 having the negative refractive power, a third lens unit LC having the positive refractive power, a fourth lens unit LF2 having the positive refractive power, and a fifth lens unit LR having the negative refractive power. The third lens unit LC and the fourth lens unit LF2 correspond to the intermediate unit, and the fifth lens unit LR corresponds to the final lens unit. In focusing from infinity to a short distance, the second lens unit LF1 is moved toward the image plane, the fourth lens unit LF2 is moved toward the object, and the fifth lens unit LR is moved along a trajectory humped toward the object. The first lens unit L1 is immobilized in focusing.

The optical system L0 according to the third exemplary embodiment includes the first lens unit L1 having the positive refractive power, the second lens unit LF1 having the negative refractive power, the third lens unit LC having the positive refractive power, the fourth lens unit LF2 having the positive refractive power, and the fifth lens unit LR having the negative refractive power. The third lens unit LC and the fourth lens unit LF2 correspond to the intermediate unit, and the fifth lens unit LR corresponds to the final lens unit. In focusing from infinity to a short distance, the second lens unit LF1 is moved toward the image plane, the fourth lens unit LF2 is moved toward the object, and the first lens unit L1 and the fifth lens unit LR are immobilized.

In the first and the third exemplary embodiments, the final lens unit LR may be moved in focusing. In the second exemplary embodiment, the final lens unit LR may be immobilized in focusing. Further, in the optical system L0 according to each of the exemplary embodiments, a part of the lenses or a part of the lens units may be parallelly decentered in a direction perpendicular to an optical axis to correct an image blur. In addition, an element that substantially has no refractive power, such as a low-pass filter and an infrared cut filter may be arranged between the lens having the refractive power arranged closest to the image plane and the image plane.

Figure 4A:
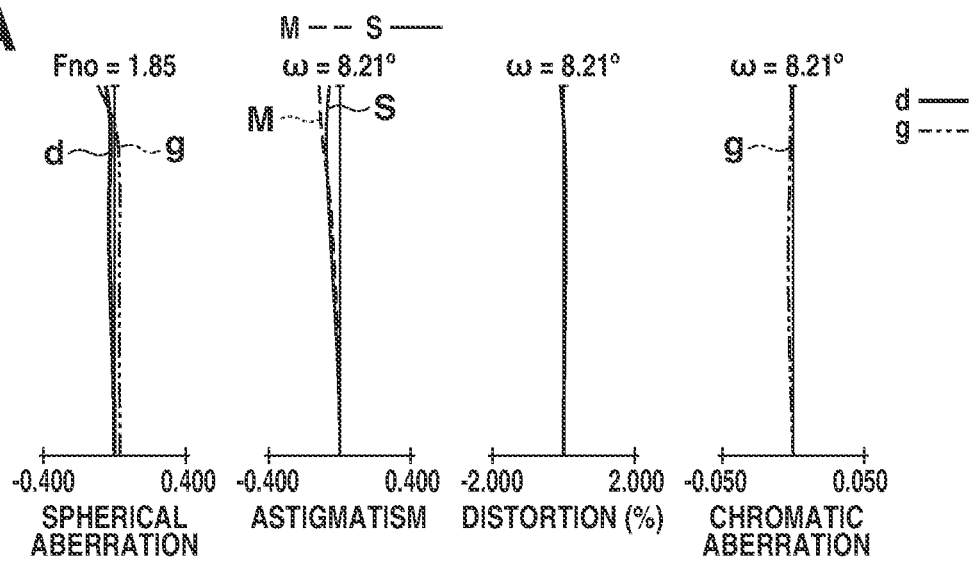
FIGS. 4A, 4B, and 4C are aberration diagrams of the optical system according to the second exemplary embodiment.
Figure 4B:
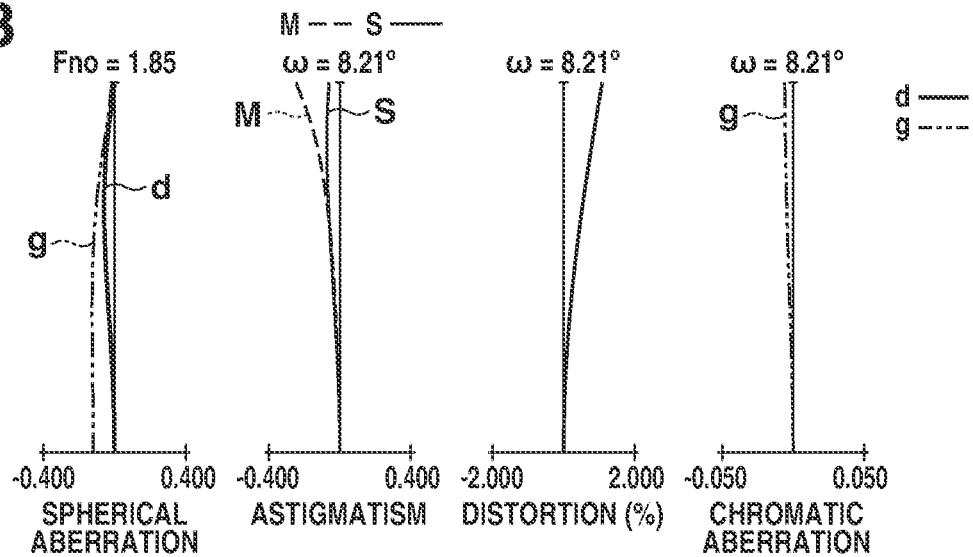
Figure 4C:
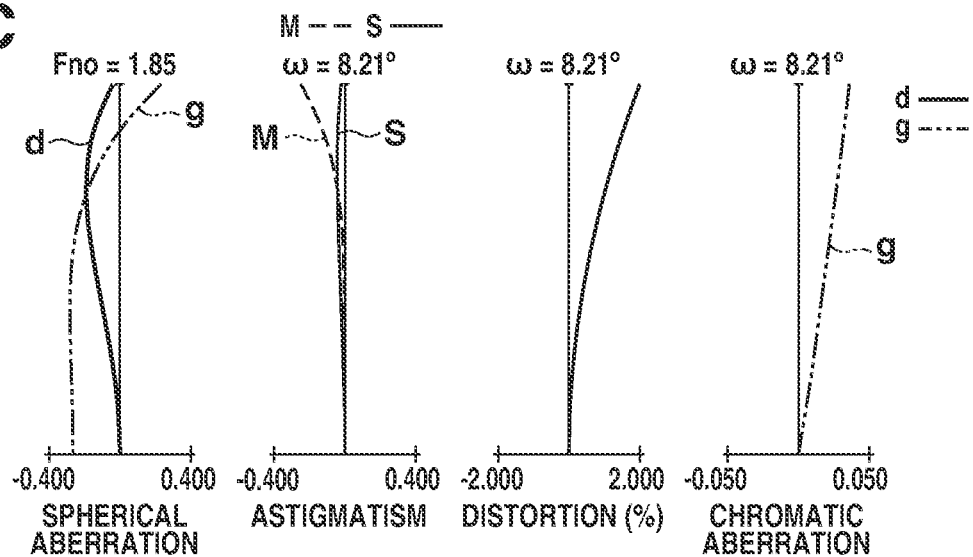
Figure 6A:
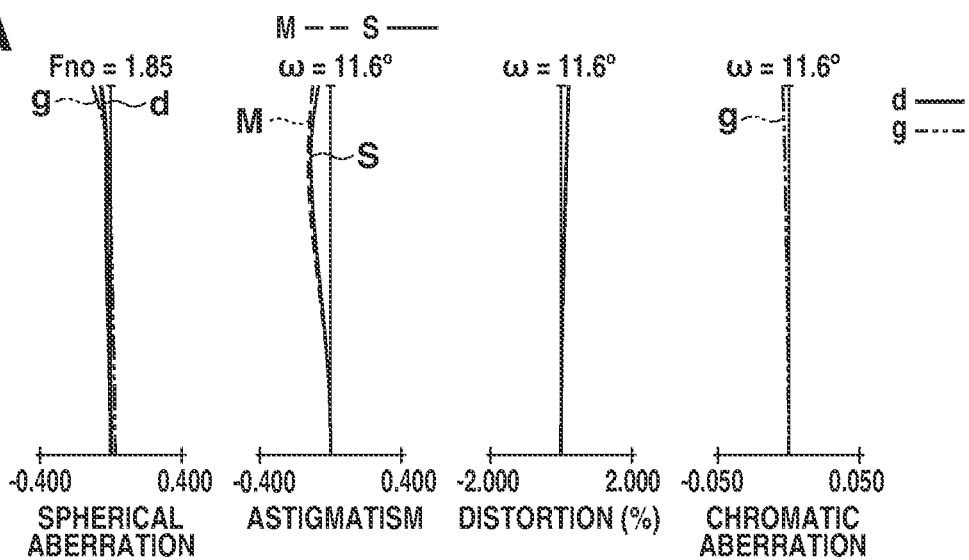
FIGS. 6A, 6B, and 6C are aberration diagrams of the optical system according to the third exemplary embodiment.
Figure 6B:
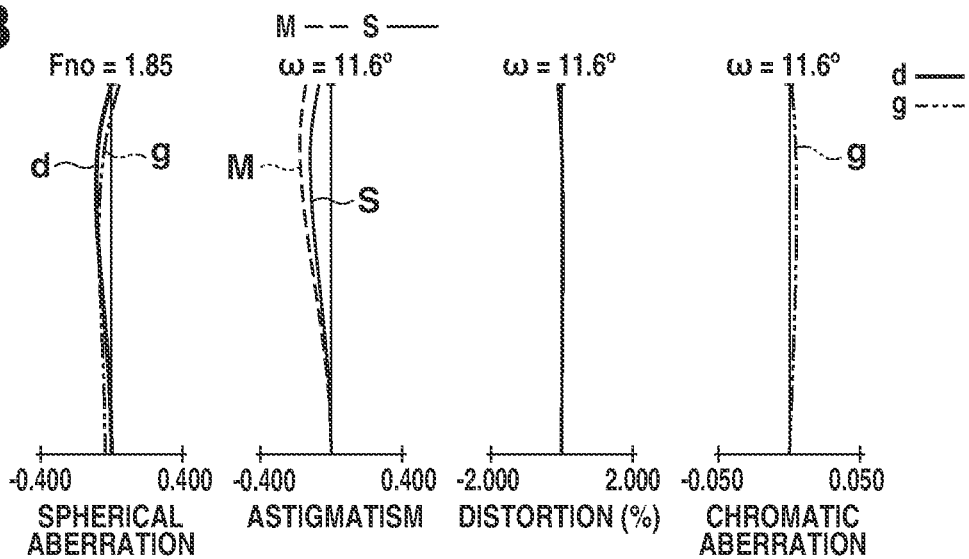
Figure 6C:
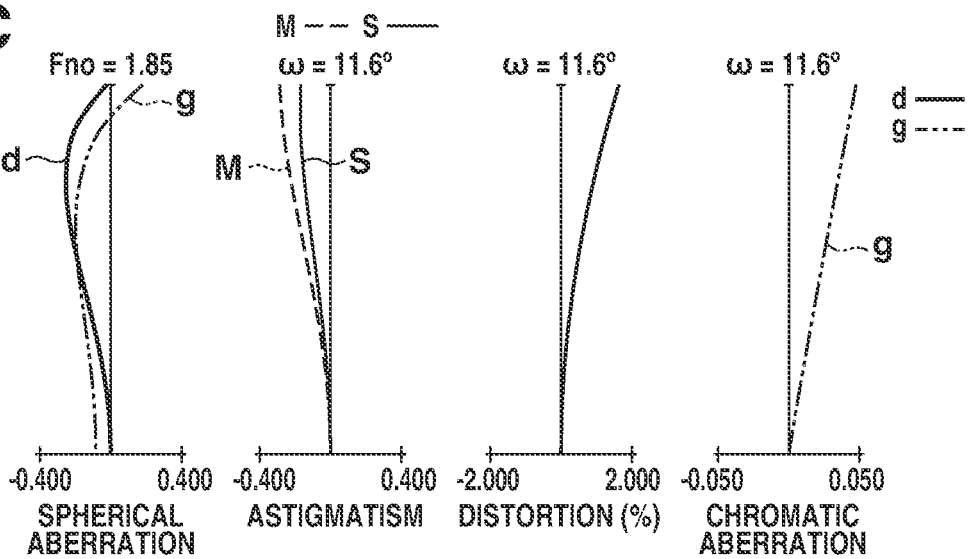

FIGS. 2A to 2C, 4A to 4C, and 6A to 6C illustrate aberration diagrams of the optical systems L0 according to the first to the third exemplary embodiments, respectively. In each aberration diagram, FIGS. 2A, 4A, and 6A are the aberration diagrams at a time of focusing on an object at infinity, FIGS. 2B, 4B, and 6B are the aberration diagrams in an in-focus state with an imaging magnification β of −0.2, and FIGS. 2C, 4C, and 6C are the aberration diagrams in an in-focus state with an imaging magnification β of −0.5.

In the aberration diagrams, "Fno" indicates F-number, and "ω" indicates a half angle of view (degrees) which is an angle of view based on paraxial calculation. In spherical aberration diagrams, "d" and "g" respectively indicate a d-line (wavelength of 587.56 nm) and a g-line (wavelength of 435.835 nm).

In astigmatism diagrams, a solid line S indicates the astigmatism on a sagittal image surface for a d-line and a dashed line M indicates astigmatism on a meridional image surface for the d-line. Distortion diagrams each illustrate the distortion for the d-line. Chromatic aberration diagrams each illustrate chromatic aberration of magnification for a g-line with respect to a d-line.

Next, characteristics of the optical system L0 according to each of the exemplary embodiments will be described.

In the optical system L0 according to each of the exemplary embodiments, the second lens unit LF1 and the lens unit LF2 arranged closest to the image plane in the lens units included in the intermediate unit are moved in focusing in order to reduce aberration fluctuation accompanied by focusing.

Further, in the optical system L0 according to each of the exemplary embodiments, the first lens unit L1 has the positive refractive power so that the optical system L0 is not excessively increased in size if an aperture ratio of the optical system L0 is increased. In this regard, if the positive refractive power of the first lens unit L1 becomes larger, a fluctuation in height of a light flux incident on the second lens unit LF1 accompanied by focusing tends to easily increase. Accordingly, an aberration fluctuation tends to increase in the entire optical system L0 in a case where focusing is performed by the second lens unit LF1 being moved.

Thus, in the optical system L0 according to each of the exemplary embodiments, the fluctuation in height of the light flux incident on the lens unit LF2, which is another focusing group, is reduced by an amount of movement of the second lens unit LF1 being reduced or by the refractive power being reduced. This reduces the aberration fluctuation accompanied by focusing in the optical system L0 according to each of the exemplary embodiments.

More specifically, the optical system L0 according to each of the exemplary embodiments satisfies the following inequalities (1) and (2). Effects of the present invention can be obtained by satisfying at least one of the inequalities (1) and (2), and it is not necessarily to satisfy both expressions at the same time.

$$-0.40 < MF1/MF2 < 0.00 \tag{1}$$

$$-0.37 < fF1/f < 0.00 \tag{2}$$

In inequalities (1) and (2), "MF1" is an amount of movement of the second lens unit LF1, and "MF2" is an amount of movement of the lens unit LF2 arranged closest to the image plane in the lens units included in the intermediate unit from a state in which an object is in focus at infinity to a state in which the object is in focus with an imaging magnification β of −0.2. Further, "fF1" is a focal length of the second lens unit LF1, and "f" is a focal length of the optical system L0 when an object is in focus at infinity. Herein, an amount of movement is a difference between a position of the lens unit on the optical axis when an object is in focus at infinity and a position of the lens unit on the optical axis in a case where an object is focused at the imaging magnification β of −0.2. A sign of an amount of movement is regarded as positive in a case where the lens unit is located on the image side and as negative in a case where the lens unit is located on the object side in the in-focus state with the imaging magnification β of −0.2 compared with a time when an object is in focus at infinity.

Inequality (1) relates to a ratio of the amount of movement of the second lens unit LF1 to the amount of movement of the lens unit LF2 arranged closest to the image plane in the lens units included in the intermediate unit. In a case where the ratio is less than a lower limit value of inequality (1), the amount of movement of the second lens unit LF1 becomes larger, and the aberration fluctuation accompanied by focusing becomes larger. In a case where the ratio is greater than an upper limit value of inequality (1), movement directions of the second lens unit LF1 and the lens unit LF2 become the same. In such a case, a height of the light flux incident on the lens unit LF2 is prone to change, and thus it is difficult to control the aberration fluctuation accompanied by focusing.

If the amount of movement of the second lens unit LF1 is too small, it is difficult to suitably correct various aberrations in a case where an object at a short distance is in focus, in particular. Thus, in one embodiment a range of inequality (1) is set within a range of the following inequality (1a), and in another embodiment, within a range of the following inequality (1b).

$$-0.40 < MF1/MF2 < -0.05 \tag{1a}$$

$$-0.38 < MF1/MF2 < -0.05 \tag{1b}$$

Inequality (2) relates to the focal length of the second lens unit LF1. In a case where a ratio of the focal length is less than a lower limit value of inequality (2), the refractive power of the second lens unit LF1 becomes weaker, and fluctuation in the height of light flux incident on the lens unit LF2 accompanied by focusing becomes larger. As a result, the aberration fluctuation accompanied by focusing becomes larger.

If the focal length of the second lens unit LF1 is too small, an aberration generating in the second lens unit increases. This makes it difficult to suitably correct various aberrations in the entire optical system. Thus, in one embodiment, a range of inequality (2) is set within a range of the following inequality (2a), and in another embodiment, within a range of the following inequality (2b).

$$-0.37 < fF1/f < -0.10 \tag{2a}$$

$$-0.37 < fF1/f < -0.15 \tag{2b}$$

As described above, the aberration fluctuation accompanied by focusing can be reduced by at least one of the above-described inequalities (1) and (2) being satisfied.

In the optical system L0 according to each of the exemplary embodiments, in one embodiment, the first lens unit L1 include three positive lenses. More specifically, in another embodiment, the first lens unit L1 include, from the object side to the image side, a first lens GP1 having the positive refractive power, a second lens GP2 having the positive refractive power, and a third lens GP3 having the positive refractive power. This configuration controls generation of various aberrations while imparting an appropriate refractive power to the first lens unit L1.

In the optical system L0 according to each of the exemplary embodiments, in one embodiment, the first lens unit L1 be immobilized in focusing. This configuration simplifies a focusing mechanism and keeps an overall length of the optical system L0 constant in focusing.

In terms of simplification of the focusing mechanism, in one embodiment, the final lens unit LR be immobilized.

In one embodiment, the optical system L0 according to each of the exemplary embodiments satisfy one or more of the following inequalities:

$$-0.7 < fF1/f1 < -0.4, \tag{3}$$

$$0 < fF2/f < 0.7, \tag{4}$$

$$-1.6 < f/fR < -0.3, \tag{5}$$

$$0.6 < MF2/fF2 < 0, \tag{6}$$

$$0 < sk/TD < 0.3, \tag{7}$$

$$0.50 < STIP/TD < 0.80. \tag{8}$$

In inequalities (3) to (8), "f1" is a focal length of the first lens unit L1. "fR" is a focal length of the final lens unit LR. "fF2" is a focal length of the lens unit LF2. "sk" is a distance, in air conversion, on the optical axis from a surface of the image side of the lens closest to the image plane to the image plane IP at a time when an object at infinity is in focus. "TD" is a distance, in air conversion, on the optical axis from an object side lens surface of the lens closest to the object to the image plane IP when an object at infinity is in focus. "STIP" is a distance, in air conversion, on the optical axis from the aperture stop SP to the image plane IP at a time when an object at infinity is in focus.

Inequality (3) relates to a ratio between the focal length of the second lens unit LF1 and the focal length f1 of the first lens unit L1. If the negative refractive power of the second lens unit LF1 is weakened to an extent that the ratio is less than a lower limit value of inequality (3), a fluctuation in the height of light flux incident on the lens unit LF2 accompanied by focusing becomes larger. This makes it difficult to sufficiently reduce the aberration fluctuation accompanied by focusing. If the negative refractive power of the second lens unit LF1 is strengthened to an extent that the ratio is greater than an upper limit value of the inequality (3), it is difficult to correct various aberrations, such as spherical aberration.

Inequality (4) relates to the focal length of the lens unit LF2. If the positive refractive power of the lens unit LF2 is weakened to an extent that the ratio is greater than an upper limit value of inequality (4), the amount of movement of the lens unit LF2 in focusing increases. This leads to an increase in the size of the optical system L0. In addition, a lower limit value of the inequality (4) indicates that the refractive power of the lens unit LF2 is positive. Setting the refractive power of the lens unit LF2 to positive forms a telephoto type configuration, with the final lens unit LR having the negative refractive power. Thus, the entire optical system can be easily miniaturized. If the positive refractive power of the lens unit LF2 is too strong, sufficiently reducing the aberration fluctuation accompanied by focusing may be difficult in some cases. Thus, the lower limit value as described below may be set for inequality (4).

Inequality (5) relates to a ratio between the focal length f of the optical system L0 and the focal length fR of the final lens unit LR when an object at infinity is in focus. If the ratio is greater than an upper limit value or is less than a lower limit value of inequality (5), a fluctuation in field curvature increases in focusing. This makes it difficult to obtain high optical performance in an entire object length.

Inequality (6) relates to a ratio between the amount of movement of the lens unit LF2 and the focal length of the lens unit LF2. If the amount of movement of the lens unit LF2 becomes larger to an extent that the ratio is less than a lower limit value of inequality (6), the optical system L0 increases in size. In addition, an upper limit value of the inequality (6) indicates that the refractive power of the lens unit LF2 is positive. Setting the refractive power of the lens unit LF2 to positive forms the telephoto type configuration, with the final lens unit LR having the negative refractive power, and the entire optical system can be easily miniaturized. If the positive refractive power of the lens unit LF2 is too small, the amount of movement of the lens unit LF2 accompanied by focusing becomes too large. This may lead to an increase in the size of the optical system L0. Thus, the upper limit value as described below may be set for inequality (6).

Inequality (7) relates to back focus when an object at infinity is in focus. If the back focus is elongated to an extent to exceed an upper limit value of inequality (7), the optical system L0 increases in size. A lower limit value may be set to inequality (7) in a range appropriate for using the optical system L0 according to each of the exemplary embodiments as an interchangeable lens for a lens interchangeable camera.

Inequality (8) relates to an arrangement of the aperture stop SP when an object at infinity is in focus. If STIP/TD is greater than an upper limit value or is less than a lower limit value of inequality (8), a distance from the aperture stop SP to the lens surface closest to the object or to the lens surface closest to the image plane becomes too short. This makes it difficult to correct an off-axis aberration, such as a coma aberration and distortion.

In one embodiment, the ranges of inequalities (3) to (8) are set within the ranges of the following inequalities (3a) to (8a), respectively.

$$-0.65 < fF1/f1 < -0.40 \tag{3a}$$

$$0.1 < fF2/f < 0.6 \tag{4a}$$

$$-1.55 < f/fR < -0.50 \tag{5a}$$

$$-0.6 < MF2/fF2 < -0.1 \tag{6a}$$

$$0.1 < sk/TD < 0.3 \tag{7a}$$

$$0.5 < STIP/TD < 0.70 \tag{8a}$$

In addition, in yet another embodiment, the ranges of inequalities (3) to (8) are set within ranges of the following inequalities (3b) to (8b).

$$-0.65 < fF1/f1 < -0.45 \tag{3b}$$

$$0.3 < fF2/f < 0.6 \tag{4b}$$

$$-1.55 < f/fR < -0.70 \tag{5b}$$

$$-0.5 < MF2/fF2 < -0.1 \tag{6b}$$

$$0.1 < sk/TD < 0.2 \tag{7b}$$

$$0.5 < STIP/TD < 0.65 \tag{8b}$$

Next, first to third numerical examples respectively correspond to the first to the third exemplary embodiments will be described. In each of the numerical examples, a surface number indicates an order of an optical surface counting from an object side. "r" is a curvature radius of an optical surface, and "d" is a surface interval. "nd" and "vd" are respectively a refractive index and an Abbe number of an optical member.

An effective diameter is a diameter of a lens which is determined by passage ranges of an on axis light flux and an off-axis light flux. A position of an entrance pupil is a distance from a lens surface closest to the object (a first surface) to an entrance pupil. A position of an exit pupil is a distance from a lens surface closest to the image plane (a final lens surface) to an exit pupil. A position of a front principal point is a distance from the first surface to a front principal point. A position of a rear principal point is a distance from a final surface to a rear principal point. Each numerical value is a paraxial amount, and the direction from the object side to the image side is regarded as positive for the signs.

In each of the numerical examples, the back focus (BF) is a distance from a surface of the optical system L0 closest to the image plane to the image plane which is expressed in an air conversion length.

First Numerical Example

Unit: mm

Surface Data

| Surface Number | r | d | nd | vd | Effective Diameter |
|---|---|---|---|---|---|
| 1 | 193.557 | 7.00 | 1.61800 | 63.4 | 70.81 |
| 2 | −361.412 | 0.15 | | | 70.53 |
| 3 | 91.656 | 6.00 | 1.61800 | 63.4 | 67.55 |
| 4 | 237.665 | 0.15 | | | 66.57 |
| 5 | 57.624 | 15.30 | 1.43875 | 94.7 | 61.96 |
| 6 | −144.282 | 2.70 | 1.80000 | 29.8 | 59.27 |
| 7 | 190.514 | 0.15 | | | 55.03 |
| 8 | 46.988 | 6.90 | 1.49700 | 81.5 | 50.76 |
| 9 | 116.289 | (variable) | | | 48.86 |
| 10 | 136.733 | 3.40 | 1.95906 | 17.5 | 47.20 |
| 11 | 971.695 | 0.10 | | | 45.98 |
| 12 | 110.549 | 2.00 | 1.80420 | 46.5 | 42.59 |
| 13 | 34.395 | 5.90 | | | 37.03 |
| 14 | −970.336 | 1.80 | 1.72916 | 54.7 | 36.75 |
| 15 | 41.116 | (variable) | | | 34.16 |
| 16 (stop) | ∞ | (variable) | | | 32.97 |
| 17 | 572.156 | 1.80 | 1.85478 | 24.8 | 35.79 |
| 18 | 46.877 | 6.70 | 1.76385 | 48.5 | 37.58 |
| 19 | −345.228 | 0.15 | | | 38.47 |
| 20 | 84.551 | 5.60 | 1.90043 | 37.4 | 40.45 |
| 21 | −160.008 | (variable) | | | 40.59 |
| 22 | −142.632 | 5.80 | 1.59270 | 35.3 | 39.39 |
| 23 | −38.358 | 1.90 | 1.53172 | 48.8 | 39.46 |
| 24 | 146.610 | 27.26 | | | 39.45 |
| Image Plane | ∞ | | | | |

| | |
|---|---|
| Focal Length | 131.00 |
| F number | 1.85 |
| Half Angle of View (°) | 9.38 |
| Image Height | 21.63 |
| Overall Lens Length | 155.01 |
| BF | 27.26 |

Variable Interval

| | Infinity | −0.2 times | −0.5 times |
|---|---|---|---|
| d9 | 1.90 | 4.34 | 8.59 |
| d15 | 12.35 | 9.91 | 5.66 |
| d16 | 27.20 | 15.61 | 2.10 |
| d21 | 12.80 | 24.39 | 37.90 |

| | |
|---|---|
| Position of Entrance Pupil | 129.93 |
| Position of Exit Pupil | −63.50 |
| Position of Front Principal Point | 71.85 |
| Position of Rear Principal Point | −103.74 |

Lens Unit Data

| Unit | Starting Surface | Focal Length | Lens Configuration Length | Position of Front Principal Point | Position of Rear Principal Point |
|---|---|---|---|---|---|
| 1 | 1 | 61.53 | 38.35 | 3.65 | −21.06 |
| 2 | 10 | −34.81 | 13.20 | 8.56 | −1.37 |
| 3 | 17 | 56.05 | 14.25 | 5.85 | −2.05 |
| 4 | 22 | −160.40 | 7.70 | 1.91 | −2.93 |

Single Lens Data

| Lens | Starting Surface | Focal Length |
|---|---|---|
| 1 | 1 | 204.95 |
| 2 | 3 | 237.68 |
| 3 | 5 | 96.07 |
| 4 | 6 | −102.26 |
| 5 | 8 | 153.57 |
| 6 | 10 | 165.59 |
| 7 | 12 | −62.82 |
| 8 | 14 | −54.06 |
| 9 | 17 | −59.83 |
| 10 | 18 | 54.44 |
| 11 | 20 | 62.11 |
| 12 | 22 | 86.73 |
| 13 | 23 | −56.98 |

Second Numerical Example

Unit: mm

Surface Data

| Surface Number | r | d | nd | vd | Effective Diameter |
|---|---|---|---|---|---|
| 1 | 156.397 | 8.70 | 1.61800 | 63.4 | 81.08 |
| 2 | −596.930 | 0.15 | | | 80.68 |
| 3 | 98.758 | 7.60 | 1.61800 | 63.4 | 76.76 |
| 4 | 349.280 | 0.15 | | | 75.67 |
| 5 | 62.120 | 17.10 | 1.43875 | 94.7 | 68.70 |
| 6 | −153.681 | 2.70 | 1.73800 | 32.3 | 65.61 |
| 7 | 126.090 | 0.30 | | | 59.11 |
| 8 | 46.522 | 9.30 | 1.49700 | 81.5 | 54.56 |
| 9 | 138.993 | (variable) | | | 51.66 |
| 10 | 128.047 | 4.90 | 1.95906 | 17.5 | 49.56 |
| 11 | 552.619 | 0.10 | | | 47.02 |
| 12 | 124.485 | 2.00 | 1.83481 | 42.7 | 43.81 |
| 13 | 32.185 | 6.10 | | | 37.22 |
| 14 | 1000.738 | 1.80 | 1.80400 | 46.6 | 36.93 |
| 15 | 42.828 | (variable) | | | 34.47 |
| 16 (stop) | ∞ | 4.90 | | | 33.02 |
| 17 | −121.550 | 2.50 | 1.84666 | 23.8 | 32.43 |
| 18 | −83.173 | (variable) | | | 32.51 |
| 19 | 81.632 | 1.80 | 1.84666 | 23.8 | 41.83 |
| 20 | 42.177 | 7.80 | 1.69680 | 55.5 | 42.10 |
| 21 | 1000.983 | 0.15 | | | 42.50 |
| 22 | 62.883 | 6.50 | 1.69680 | 55.5 | 43.72 |
| 23 | −407.497 | (variable) | | | 43.47 |
| 24 | 262.582 | 5.40 | 1.85025 | 30.1 | 42.76 |
| 25 | −80.645 | 1.90 | 1.76385 | 48.5 | 42.37 |
| 26 | 52.606 | (variable) | | | 40.02 |
| Image Plane | ∞ | | | | |

| | |
|---|---|
| Focal Length | 150.00 |
| F number | 1.85 |
| Half Angle of View (°) | 8.21 |
| Image Height | 21.63 |
| Overall Lens Length | 164.98 |

Variable Interval

| | Infinity | −0.2 times | −0.5 times |
|---|---|---|---|
| d 9 | 1.50 | 3.43 | 8.14 |
| d15 | 12.90 | 10.97 | 6.26 |
| d18 | 31.50 | 8.60 | 1.00 |
| d23 | 1.00 | 0.99 | 15.91 |
| d26 | 26.23 | 49.14 | 41.82 |

| | |
|---|---|
| Position of Entrance Pupil | 173.30 |
| Position of Exit Pupil | −64.44 |
| Position of Front Principal Point | 75.17 |
| Position of Rear Principal Point | −123.77 |

Unit: mm

Lens Unit Data

| Unit | Starting Surface | Focal Length | Lens Configuration Length | Position of Front Principal Point | Position of Rear Principal Point |
|---|---|---|---|---|---|
| 1 | 1 | 63.23 | 46.00 | 4.13 | −25.46 |
| 2 | 10 | −31.52 | 14.90 | 9.05 | −1.79 |
| 3 | 16 | 302.12 | 7.40 | 9.06 | 2.85 |
| 4 | 19 | 54.57 | 16.25 | 3.94 | −5.83 |
| 5 | 24 | −99.84 | 7.30 | 5.48 | 1.41 |

Single Lens Data

| Lens | Starting Surface | Focal Length |
|---|---|---|
| 1 | 1 | 201.42 |
| 2 | 3 | 220.25 |
| 3 | 5 | 103.32 |
| 4 | 6 | −93.47 |
| 5 | 8 | 136.15 |
| 6 | 10 | 172.80 |
| 7 | 12 | −52.51 |
| 8 | 14 | −55.70 |
| 9 | 17 | 302.12 |
| 10 | 19 | −105.27 |
| 11 | 20 | 62.98 |
| 12 | 22 | 78.63 |
| 13 | 24 | 73.09 |
| 14 | 25 | −41.42 |

Third Numerical Example

Unit: mm

Surface Data

| Surface Number | r | d | nd | vd | Effective Diameter |
|---|---|---|---|---|---|
| 1 | 382.997 | 2.70 | 1.88300 | 40.8 | 60.90 |
| 2 | 967.629 | 0.15 | | | 60.33 |
| 3 | 133.089 | 5.60 | 1.76385 | 48.5 | 58.83 |
| 4 | −911.318 | 0.15 | | | 57.94 |
| 5 | 65.899 | 12.10 | 1.43875 | 94.7 | 53.03 |
| 6 | −111.068 | 2.70 | 1.85478 | 24.8 | 50.94 |
| 7 | 985.624 | 0.30 | | | 48.98 |
| 8 | 50.416 | 5.70 | 1.53775 | 74.7 | 45.80 |
| 9 | 141.108 | (variable) | | | 44.38 |
| 10 | 152.399 | 3.30 | 1.95906 | 17.5 | 42.96 |
| 11 | −975.547 | 0.10 | | | 42.00 |
| 12 | 172.070 | 2.00 | 1.74951 | 35.3 | 39.78 |
| 13 | 45.096 | 5.10 | | | 35.85 |
| 14 | −143.645 | 1.80 | 1.69680 | 55.5 | 35.61 |
| 15 | 42.126 | (variable) | | | 33.31 |
| 16 (stop) | ∞ | 2.20 | | | 33.01 |
| 17 | −950.175 | 1.70 | 1.91082 | 35.3 | 32.96 |
| 18 | −278.944 | (variable) | | | 32.96 |
| 19 | −358.707 | 1.80 | 1.85478 | 24.8 | 32.83 |
| 20 | 59.252 | 5.80 | 1.75500 | 52.3 | 34.75 |
| 21 | −158.838 | 0.15 | | | 35.77 |
| 22 | 86.216 | 5.20 | 1.87070 | 40.7 | 37.92 |
| 23 | −140.445 | (variable) | | | 38.12 |
| 24 | −87.203 | 2.70 | 1.95375 | 32.3 | 37.85 |
| 25 | −63.730 | 8.80 | | | 38.22 |
| 26 | −49.885 | 1.90 | 1.51742 | 52.4 | 36.53 |
| 27 | 611.667 | 25.21 | | | 37.29 |
| Image Plane | ∞ | | | | |

| Focal Length | 105.00 |
|---|---|
| F number | 1.85 |
| Half Angle of View (°) | 11.64 |

Unit: mm

| Image Height | 21.63 |
|---|---|
| Overall Lens Length | 145.01 |

Variable Interval

| | Infinity | −0.2 times | −0.5 times |
|---|---|---|---|
| d9 | 1.70 | 5.03 | 11.06 |
| d15 | 14.75 | 11.42 | 5.39 |
| d18 | 20.60 | 11.56 | 0.98 |
| d23 | 10.80 | 19.84 | 30.42 |

| Position of Entrance Pupil | 92.84 |
|---|---|
| Position of Exit Pupil | −52.68 |
| Position of Front Principal Point | 56.30 |
| Position of Rear Principal Point | −79.79 |

Lens Unit Data

| Unit | Starting Surface | Focal Length | Lens Configuration Length | Position of Front Principal Point | Position of Rear Principal Point |
|---|---|---|---|---|---|
| 1 | 1 | 60.71 | 29.40 | 4.37 | −14.55 |
| 2 | 10 | −38.20 | 12.30 | 8.93 | −0.35 |
| 3 | 16 | 433.00 | 3.90 | 3.46 | 0.37 |
| 4 | 19 | 58.41 | 12.95 | 6.25 | −0.87 |
| 5 | 24 | −148.83 | 13.40 | 13.79 | 2.23 |

Single Lens Data

| Lens | Starting Surface | Focal Length |
|---|---|---|
| 1 | 1 | 716.34 |
| 2 | 3 | 152.39 |
| 3 | 5 | 96.27 |
| 4 | 6 | −116.65 |
| 5 | 8 | 142.73 |
| 6 | 10 | 137.63 |
| 7 | 12 | −82.09 |
| 8 | 14 | −46.56 |
| 9 | 17 | 433.00 |
| 10 | 19 | −59.37 |
| 11 | 20 | 57.82 |
| 12 | 22 | 62.02 |
| 13 | 24 | 235.04 |
| 14 | 25 | −89.05 |

The following table indicates various values according to each exemplary embodiment.

TABLE 1

| Value | First Exemplary Embodiment | Second Exemplary Embodiment | Third Exemplary Embodiment |
|---|---|---|---|
| MF1 | 2.44 | 1.93 | 3.33 |
| MF2 | −11.59 | −22.90 | −9.04 |
| fF1 | −34.81 | −31.52 | −38.20 |
| f | 131.00 | 150.00 | 105.00 |
| f1 | 61.53 | 63.23 | 60.71 |
| fR | −160.40 | −99.84 | −148.83 |
| fF2 | 56.05 | 54.57 | 58.41 |
| sk | 27.26 | 26.23 | 25.21 |
| TD | 155.01 | 164.98 | 145.01 |
| STIP | 89.21 | 89.68 | 86.86 |

| Conditional Expression | First Exemplary Embodiment | Second Exemplary Embodiment | Third Exemplary Embodiment |
|---|---|---|---|
| (1) MF1/MF2 | −0.21 | −0.08 | −0.37 |
| (2) fF1/f | −0.27 | −0.21 | −0.36 |
| (3) fF1/f1 | −0.57 | −0.50 | −0.63 |
| (4) fF2/f | 0.43 | 0.36 | 0.56 |
| (5) f/fR | −0.82 | −1.50 | −0.71 |
| (6) MF2/fF2 | −0.21 | −0.42 | −0.15 |
| (7) sk/TD | 0.18 | 0.16 | 0.17 |
| (8) STIP/TD | 0.58 | 0.54 | 0.60 |

[Image Capturing Apparatus]

Figure 7:
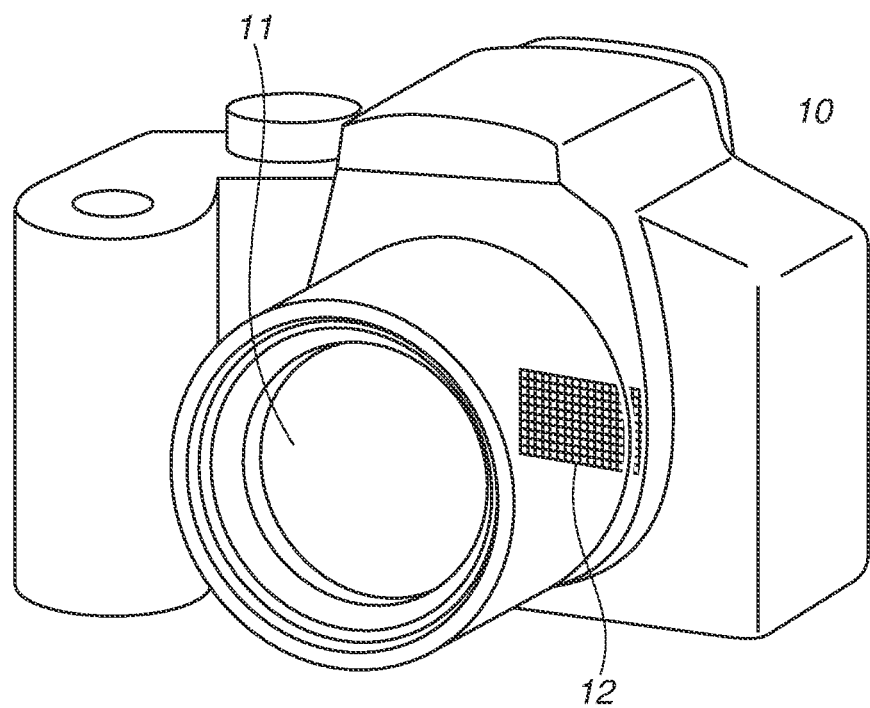
FIG. 7 is a schematic diagram of an image capturing apparatus.

An exemplary embodiment of an image capturing apparatus according to the present invention will be described. FIG. 7 is a schematic drawing of an image capturing apparatus (a digital still camera) 10 according to the present exemplary embodiment. The image capturing apparatus 10 includes a camera main body 13, an optical system 11 similar to any one of the above-described first to third exemplary embodiments, and a light receiving element (an image pickup element) 12 which performs photoelectric conversion on an image formed by the optical system 11.

The image capturing apparatus 10 according to the present exemplary embodiment is capable of obtaining a high quality image formed by the optical system 11 in which an aberration fluctuation accompanied by focusing is reduced.

As the light receiving element 12, an image pickup element, such as a CCD sensor and a CMOS sensor, can be used. Various aberrations such as a distortion and a chromatic aberration in an image obtained by the light receiving element 12 are electrically corrected, and thus the image quality of an output image can be enhanced.

The optical system L0 according to each of the above-described exemplary embodiments can be applied to various types of optical equipment, such as a silver-halide film camera, a video camera, and a telescope without being limited to a digital still camera illustrated in FIG. 7.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical system comprising: in order from an object side to an image side, a first lens unit having a positive refractive power, a second lens unit having a negative refractive power, an intermediate unit consisting of one lens unit having a positive refractive power, and a final lens unit having a negative refractive power,
   wherein a distance between adjacent lens units changes in focusing, and a total number of lens units arranged in the optical system is four,
   wherein the first lens unit includes a positive meniscus lens with convex surface facing the object side which is arranged closest to an image side in the first lens unit, and a cemented lens arranged adjacent to the object side of the positive meniscus lens,
   wherein the second lens unit consists of two negative lenses and one positive lens,
   wherein the intermediate unit consists of two positive lenses and one negative lens,
   wherein the final lens unit includes a positive lens and a negative lens arranged in this order from an object side to an image side,
   wherein, in focusing from a state of focusing on an infinity to a state in which the object is focused at the imaging magnification of −0.5,
   the second lens unit moves toward an image side and the intermediate unit moves toward the object side,
   wherein the following inequality is satisfied:

$0.36 \leq fF2/f < 0.7$ where fF2 is a focal length of the intermediate unit, and f is a focal length of the optical system when an object is in focus at infinity.

2. The optical system according to claim 1, wherein the first lens unit is fixed in focusing.

3. The optical system according to claim 1, wherein the following inequality is satisfied:

$-0.7 < fF1/f1 < -0.4$, where fF1 is a focal length of the second lens unit and f1 is a focal length of the first lens unit.

4. The optical system according to claim 1, wherein the following inequality is satisfied:

$-0.4 < MF1/MF2 < 0$ where MF1 is an amount of movement of the second lens unit, and MF2 is an amount of movement of the intermediate unit, an amount of movement is a difference between a position of a lens unit when an object is in focus at infinity and a position of the lens unit when an object is focused at the imaging magnification of −0.2.

5. The optical system according to claim 1, wherein the following inequality is satisfied:

$-1.6 < f/fR < -0.3$, where fR is a focal length of the final lens unit.

6. The optical system according to claim 1, wherein the following inequality is satisfied:

$-0.6 < MF2/fF2 < 0$, where MF2 is an amount of movement of the intermediate unit, the movement being accompanied by focusing from a state in which an object is in focus at infinity to a state in which the object is in focus with an imaging magnification of −0.2.

7. The optical system according to claim 1, wherein the following inequality is satisfied:

$0 < sk/TD < 0.3$, where sk is a distance on an optical axis from an image side lens surface of a lens closest to the image plane to the image plane when an object is in focus at infinity, and TD is a distance from an object side lens surface of a lens closest to the object to the image plane when an object is in focus at infinity.

8. The optical system according to claim 1, further comprising an aperture stop, and
   wherein the following inequality is satisfied:

$0.5 < STIP/TD < 0.8$, where STIP is a distance on an optical axis from the aperture stop to the image plane when an object is in focus at infinity, and TD is a distance on the optical axis from an object side lens surface of a lens closest to the object to the image plane when an object is in focus at infinity.

9. The optical system according to claim 1, wherein the final lens unit is fixed in focusing.

10. The optical system according to claim 1, wherein the following inequality is satisfied:

$$-0.37 < fF1/f < 0,$$

where fF1 is a focal length of the second lens unit.

11. An image capturing apparatus comprising the optical system according to claim 1 and an image pickup element configured to receive an optical image formed by the optical system.

12. The image capturing apparatus according to claim 11, wherein in the optical system, the first lens unit is fixed in focusing.

13. The image capturing apparatus according to claim 11, wherein in the optical system, the following inequality is satisfied:

$$-0.7 < fF1/f1 < -0.4,$$

where fF1 is a focal length of the second lens unit and f1 is a focal length of the first lens unit.

14. The image capturing apparatus according to claim 11, wherein in the optical system, the following inequality is satisfied:

$$-1.6 < f/fR < -0.3,$$

where fR is a focal length of the final lens unit.

15. The image capturing apparatus according to claim 11, wherein the two negative lenses arranged in the second lens unit are a meniscus lens with a convex surface facing the object side and a biconcave lens.

16. The optical system according to claim 1, wherein the two negative lenses arranged in the second lens unit are a meniscus lens with a convex surface facing the object side and a biconcave lens.

* * * * *